US012606449B2

(12) United States Patent
Zones

(10) Patent No.: US 12,606,449 B2
(45) Date of Patent: Apr. 21, 2026

(54) MOLECULAR SIEVE SSZ-117X WITH HIGH ACIDITY

(71) Applicant: Chevron U.S.A. Inc., San Ramon, CA (US)

(72) Inventor: Stacey I. Zones, San Francisco, CA (US)

(73) Assignee: Chevron U.S.A. Inc.

( * ) Notice: Subject to any disclaimer, the term of this patent is extended or adjusted under 35 U.S.C. 154(b) by 521 days.

(21) Appl. No.: 18/325,342

(22) Filed: May 30, 2023

(65) Prior Publication Data

US 2023/0382748 A1 Nov. 30, 2023

Related U.S. Application Data

(60) Provisional application No. 63/365,514, filed on May 31, 2022.

(51) Int. Cl.

| | |
|---|---|
| ***C01B 39/48*** | (2006.01) |
| ***B01J 29/04*** | (2006.01) |
| ***B01J 29/70*** | (2006.01) |
| ***C01B 39/06*** | (2006.01) |

(52) U.S. Cl.

CPC ............. *C01B 39/48* (2013.01); *B01J 29/047* (2013.01); *B01J 29/70* (2013.01); *C01B 39/06* (2013.01); *C01P 2002/72* (2013.01)

(58) Field of Classification Search

CPC . B01J 20/18; B01J 29/047; B01J 29/70; B01J 29/86; B01J 2229/42; B01J 2235/15; C01B 39/06; C01B 39/48; C01P 2002/72

See application file for complete search history.

(56) References Cited

U.S. PATENT DOCUMENTS

| | | | |
|---|---|---|---|
| 11,161,750 B1 | 11/2021 | Zones | |
| 2005/0087478 A1* | 4/2005 | Zones | C07C 1/20 585/407 |
| 2005/0194289 A1 | 9/2005 | Overbeek et al. | |
| 2006/0115417 A1 | 6/2006 | Yuen et al. | |
| 2008/0058196 A1 | 3/2008 | Zones et al. | |
| 2011/0318263 A1 | 12/2011 | Zones et al. | |
| 2015/0011787 A1 | 1/2015 | Bellussi et al. | |
| 2017/0128923 A1 | 5/2017 | Yang et al. | |
| 2019/0256364 A1 | 8/2019 | Zones et al. | |
| 2019/0375648 A1 | 12/2019 | Xie et al. | |
| 2021/0221696 A1 | 7/2021 | Zones et al. | |
| 2022/0072520 A1 | 3/2022 | Zones et al. | |

FOREIGN PATENT DOCUMENTS

| | | |
|---|---|---|
| CN | 113343948 A | 9/2021 |
| WO | 2021082140 A1 | 5/2021 |

OTHER PUBLICATIONS

International Search Report and Written Opinion from PCT/US2023/067601 mailed Oct. 4, 2023.

* cited by examiner

*Primary Examiner* — Brian A Mccaig
(74) *Attorney, Agent, or Firm* — Erich Joseph Gess; Melissa M. Hayworth; Terrence Michael Flaherty

(57) ABSTRACT

A novel synthetic crystalline aluminogermanosilicate molecular sieve material, designated SSZ-117x, is provided which exhibits increased acidity. The SSZ-117x can be synthesized using N,N,N,3,5-pentamethyladamantan-1-ammonium cations as a structure directing agent. The synthesis employs a boron pathway to achieve increased acid sites. The SSZ-117x of increased acidity may be used in organic compound conversion reactions and/or sorptive processes.

18 Claims, No Drawings

MOLECULAR SIEVE SSZ-117X WITH HIGH ACIDITY

CROSS REFERENCE TO RELATED APPLICATIONS

The present application claims priority to U.S. Provisional Application No. 63/365,514, filed May 31, 2022, the complete disclosure of which is incorporated herein by reference in its entirety.

FIELD

This disclosure relates to a novel synthetic crystalline molecular sieve designated SSZ-117x having increased acidity, and its synthesis.

BACKGROUND

Zeolitic materials are known to have utility as sorbents and to have catalytic properties for various types of organic compound conversion reactions. Certain zeolitic materials are ordered, porous crystalline materials having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

There are currently over 250 known zeolitic framework structures recognized by the International Zeolite Association. There exists a need for new structures, having different properties than those of known materials, for improving the performance of many organic compound conversion and sorption processes. Each structure has unique pore, channel and cage dimensions, which gives its particular properties as described above. Each framework structure also has a particular composition. Improvements in preparing more pure, single phase materials are always important. Providing molecular sieves with increased acid sites can be valuable with regard to the catalysis in organic compound conversion reactions.

SUMMARY

According to the present disclosure, a crystalline molecular sieve, designated SSZ-117x, with increased acid sites, has been synthesized using N,N,N,3,5-pentamethyladamantan-1-ammonium cations as a structure directing agent (SDA). The synthesis is conducted through a boron pathway, and the final molecular sieve contains some boron. In one embodiment, the amount of boron can range from 50-250 ppm.

The present SSZ-117x molecular sieve having increased acid sites, and hence increased acidity, can have a chemical composition comprising the following molar relationship.

TABLE 1

| | Typical | Preferred |
|---|---|---|
| $TO_2/Al_2O_3$ | ≥150 | ≥300 |

wherein T is a tetravalent element consisting of silicon and germanium. The present SSZ-117x also has comparatively increased acid sites and some boron in the framework. The $SiO_2/GeO_2$ ratio can also range from 4 to 12, or in one embodiment 7 to 10.

In one embodiment, there is provided a method of synthesizing the molecular sieve having enhanced acidity as described herein. The method comprises (a) providing a reaction mixture comprising: (1) a FAU framework type zeolite; (2) a source of germanium; (3) a source of boron; (4) N,N,N,3,5-pentamethyladamantan-1-ammonium hydroxide (Q); (5) a source of fluoride ions; and (6) water, and (b) the reaction mixture is then subjected to crystallization conditions sufficient to form crystals of a SSZ-117x boron molecular sieve.

The boron containing molecular sieve is then treated to remove the structure directing agent (SDA), noted as Q above. The SDA can be removed by calcination, or by ozone treatment, e.g., at 150° C. It has also been found that treatment of the molecular sieve with dimethylformamide can remove the SDA.

Once the SDA has been removed, the boron containing SSZ-117x molecular sieve is treated to replace boron in the framework with aluminum. A molecular sieve with increased acid sites is then recovered. The molecular sieve is an acid site rich SSZ-117x.

In yet a further aspect, there is provided a process of converting a feedstock comprising an organic compound to a conversion product which comprises contacting the feedstock at organic compound conversion conditions with a catalyst comprising the SSZ-117x molecular sieve having increased acid sites described herein.

Among other factors, the present process allows one to obtain a SSZ-117x molecular sieve with increased acid sites. By increased acid sites is meant that by using the present process with its boron pathway, a SSZ-117x molecular sieve can be obtained with more acid sites than would be possible by preparing the molecular sieve conventionally in a straight forward method with aluminum sites and no boron sites. When the conventional route is employed, it has been found that some amorphous phase occurs so a loss of Al acid sites is experienced. It has been found, quite surprisingly, that by first inserting boron in the framework, and then replacing the boron with aluminum, a SSZ-117x molecular sieve having a comparatively enhanced number of acid sites can be achieved. Thus, the SSZ-117x molecular sieve is acid rich or of enhanced acidity. The increased acid sites can result in improved catalytic characteristics for the present SSZ-117x molecular sieve. The present SSZ-117x molecular sieve also contains some boron.

DETAILED DESCRIPTION

Definitions

The term "framework type" has the meaning described in the "Atlas of Zeolite Framework Types," by Ch. Baerlocher and L. B. McCusker and D. H. Olsen (Elsevier, Sixth Revised Edition, 2007).

The term "zeolite" generally refers to a synthetic aluminosilicate molecular sieve having a framework constructed of alumina and silica (i.e., repeating $SiO_4$ and $AlO_4$ tetrahedral units).

The term "aluminogermanosilicate" refers to a crystalline microporous solid including aluminum, germanium and silicon oxides within its framework structure. The aluminogermanosilicate may be a "pure-aluminogermanosilicate"

(i.e., absent other detectable metal oxides with its framework structure) or optionally substituted. When described as "optionally substituted," the respective framework may contain other atoms (e.g., B, Ga, In, Fe, Ti, Zr) substituted for one or more of the atoms not already present in the parent framework.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

By "increased," or "more," acid sites is meant that the SSZ-117x molecular sieve prepared by the present process comprises more acid sites than would be possible by preparing the molecular sieve conventionally, without employing the present boron pathway. When the conventional, straight forward method with aluminum is employed, it has been discovered that an amorphous phase occurs which causes a loss of Al acid sites. It has been found, quite surprisingly, that by first inserting boron in the SSZ-117x framework, and then replacing the boron with aluminum, a SSZ-117x molecular sieve having comparatively more aluminum acid sites is obtained than would be obtained if the boron were not introduced in the initial preparation of the molecular sieve. This increased acidity can impact, improve, the catalytic characteristics of the molecular sieve. The molecular sieve would be quite useful, e.g., in converting a feedstock comprising an organic compound to a conversion product. Due to the boron pathway, some boron does remain in the SSZ-117x molecular sieve.

Synthesis of the Molecular Sieve

The present molecular sieve SSZ-117x is synthesized using a boron pathway. The process comprises: (a) providing a reaction mixture comprising (1) a silicon oxide source such as a FAU framework type zeolite; (2) a source of germanium; (3) a source of boron; (4) N,N,N,3,5-pentamethyladamantan-1-ammonium hydroxide (Q); (5) a source of fluoride ions; and (6) water; and then (b) subjecting the reaction mixture to crystallization conditions sufficient to form crystals of a SSZ-117x boron molecular sieve. In one embodiment, the FAU framework zeolite has only a small amount of $Al_2O_3$. The ratio of $SiO_2/Al_2O_3$ can be 300 or greater. Thus, the framework contains a predominant amount of boron.

The SDA is removed from the molecular sieve, e.g., either by calcination or ozone treatment, and then the molecular sieve is treated to replace at least some, if not most, of the boron sites with aluminum. A SSZ-117x molecular sieve with increased acid sites can then be recovered.

The reaction mixture can have a composition, in terms of molar ratios, within the ranges set forth in Table 2:

TABLE 2

| Reactants | Typical | Preferred |
|---|---|---|
| $TO_2/B_2O_3$ | ≥10 | 15 to 20 |
| $Q/TO_2$ | 0.10 to 1.00 | 0.20 to 0.70 |
| $F/TO_2$ | 0.10 to 1.00 | 0.20 to 0.70 |
| $H_2O/TO_2$ | 2 to 10 | 4 to 8 |
| $SiO_2/GeO_2$ | 4 to 12 | 7 to 10 |

wherein T and Q are as described herein above.

Suitable sources of silicon oxide can include any suitable known source such as colloidal silica, fumed silica, precipitated silica, or alkali metal silicates. A FAU framework type zeolite, e.g., zeolite Y, can also be a source of silicon oxide. In such a case, the FAU framework type zeolite has a very high $SiO_2/Al_2O_3$ molar ratio of at least 250, and preferably at least 300 (e.g., 300 to 500). The FAU framework type zeolite can comprise two or more FAU framework type zeolites having different $SiO_2/Al_2O_3$ molar ratios. The FAU framework type zeolite can be zeolite Y, or any of its various post-synthetic modified forms, as is known in the art.

Sources of germanium can include germanium oxide and germanium alkoxides (e.g., germanium ethoxide, germanium isopropoxide).

Silicon and germanium may be present in the reaction mixture in a $SiO_2/GeO_2$ molar ratio of 4 to 12 (e.g., 6 to 10).

Sources of boron can include boric acid, which is preferred. Other suitable sources can also be used but are not preferred.

Sources of fluoride ions can include, for example, hydrogen fluoride, ammonium fluoride, and ammonium bifluoride.

SSZ-117x with boron is synthesized using a structure directing agent comprising N,N,N,3,5-pentamethyladamantan-1-ammonium cations (Q+), represented by the following structure (1):

(1)

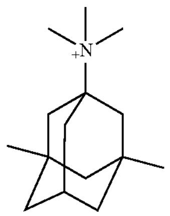

The reaction mixture typically has a Q/F molar ratio in a range of 0.80 to 1.20 (e.g., 0.85 to 1.15, 0.90 to 1.10, 0.95 to 1.05, or 1 to 1).

The reaction mixture can contain seeds of a molecular sieve material, such as boron SSZ-117x from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of boron SSZ-117x over any undesired phases.

It is noted that the reaction mixture components can be supplied by more than one source. Also, two or more reaction components can be provided by one source. The reaction mixture can be prepared either batchwise or continuously.

The reaction mixture can be prepared either batch wise or continuously, Crystal size, morphology and crystallization time of the molecular sieve described herein can vary with the nature of the reaction mixture and the crystallization conditions.

Crystallization and Post-Synthesis Treatment

Consistent with the boron pathway, crystallization of the molecular sieve from the above reaction mixture can be carried out under either static, tumbled or stirred conditions in a suitable reactor vessel (e.g., a polypropylene jar or a Teflon™-lined or stainless-steel autoclave) at a temperature of from 125° C. to 200° C. (e.g., 150° C. to 170° C.) for a time sufficient for crystallization to occur at the temperature used (e.g., 1 day to 20 days, or 2 days to 10 days). The hydrothermal crystallization process is typically conducted under pressure, such as in an autoclave, and is preferably under autogenous pressure.

Once the molecular sieve crystals containing boron have formed, the solid product can be recovered from the reaction mixture by standard mechanical separation techniques such as centrifugation or filtration. The recovered crystals are water-washed and then dried to obtain as-synthesized molecular sieve crystals of SSZ-117x boron. The drying step can be performed at an elevated temperature (e.g., 75° C. to 150° C.) for several hours (e.g., about 4 to 24 hours). The drying step can be performed under vacuum or atmospheric pressure.

As a result of the crystallization process, the recovered crystalline molecular sieve product contains within its pore structure at least a portion of the structure directing agent used in the synthesis. The as-synthesized molecular sieve may be subjected to treatment to remove part or all of the structure directing agent used in its synthesis.

Removal of the structure directing agent may be carried out by thermal treatment (e.g., calcination) in which the as-synthesized molecular sieve is heated at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in the presence of an oxygen-containing gas.

Additionally, or alternatively, the structure directing agent may be removed by treatment with ozone. See, e.g., A. N. Parikh et al., Micropor. Mesopor. Mater. 2004, 76, 17-22. In one embodiment, the use of ozone is preferred in that it provides a higher micropore volume. It has also been found that the SDA can be removed by treatment with the dimethylformamide, e.g., treatment at about 150° C.

The molecular sieve crystals can then be treated to replace at least some of the boron, although preferably most (at least 90%) if not nearly all of the boron, with aluminum. In one embodiment, the amount of boron remaining after the exchange procedure can be an amount ranging from 50 to 250 ppm boron. Conventional techniques can be used, e.g., by ion exchange. However, treating the molecular sieve with aqueous aluminum nitrate is a preferred manner of replacing the boron in the framework with aluminum. The treatment can be accomplished by contacting the molecular sieve with an aluminum nitrate solution under reflux.

Characterization of the Molecular Sieve

The final SSZ-117x molecular sieve has a composition comprising the molar relationship:

$$Al_2O_3{:}(n)TO_2$$

where n is ≥150; and T is a tetravalent element comprising silicon and germanium. In one embodiment, n in the foregoing relationship is 300 or greater, and in one embodiment, in the range of 300 to 600.

The molecular sieve can have a chemical composition comprising the following molar relationship, set forth in Table 1:

TABLE 1

| | Typical | Preferred |
|---|---|---|
| $TO_2/Al_2O_3$ | ≥150 | ≥300 |

wherein T is a tetravalent element consisting of silicon and germanium. The present SSZ-117x also has comparatively increased acid sites and some boron in the framework. The $SiO_2/GeO_2$ ratio can also range from 4 to 12, or in one embodiment 7 to 10.

The acid enhanced SSZ-117x will have a powder XRD diffraction pattern which includes the following peaks:

TABLE 3

| 2-Theta[a] | d-Spacing, nm | Relative Intensity[b] |
|---|---|---|
| 8.00 | 1.10 | M |
| 11.65 | 0.76 | VS |
| 18.8 | 0.47 | M |
| 21.8 | 0.41 | M(Broad) |
| 22.8 | 0.39 | S |

[a]±0.30 degrees

[b]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

As will be understood by those of skill in the art, the determination of the parameter 2-theta (2θ) is subject to both human and mechanical error, which in combination can impose an uncertainty of about ±0.30° on each reported value of 2-theta. The relative intensity ($100\times I/I_o$) is recorded as the ratio of the peak intensity to that of the most intense peak, which is assigned a value of 100. The relative intensities of the d-spacings are indicated by the notations VS, S, M, and W which represent very strong, strong, medium, and weak, respectively. In terms of relative intensity, the above designations are defined as: W (weak)<20; M (medium) is >20 and <40; S (strong) is 40 and <60; and VS (very strong) is 60. When the intensity is near the endpoint for a range, the intensity may be characterized as being in either of the ranges. For example, intensities of 18-22 may be listed as W-M. However, due to variations in intensity of the lines, as known in the art, one or more of the lines may have an intensity that is in an adjacent range The powder X-ray diffraction pattern presented herein was collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

The increased acidity of the present molecular sieve can be measured, for example, by measuring its Bronsted acidity.

Sorption and Catalysis

The present molecular sieve SSZ-117x (where part or all of Q+ is removed) may be used as a sorbent or as a catalyst to catalyze a wide variety of organic compound conversion processes including many of present commercial/industrial importance. Examples of chemical conversion processes which are effectively catalyzed by the acid rich SSZ-117x, by itself or in combination with one or more other catalytically active substances including other crystalline catalysts, include those requiring a catalyst with acid activity, or a catalytic metal. Examples of organic conversion processes which may be catalyzed by acid rich SSZ-117x include cracking, hydrocracking, disproportionation, alkylation, oligomerization, aromatization, and isomerization. The molecular sieve can also be used in exchanging heavy metals, such as copper, which can be useful in reducing nitrous oxide pollutants.

As in the case of many catalysts, it may be desirable to incorporate acid rich SSZ-117x with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with acid rich SSZ-117x (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-117x include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present acid rich SSZ-117x also include inorganic oxides, such as silica, zirconia, titania, magnesia, beryllia, alumina, and mixtures thereof.

In addition to the foregoing materials, acid rich SSZ-117x can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of acid rich SSZ-117x and inorganic oxide matrix may vary widely, with the SSZ-117x content ranging from 1 to 90 wt. % (e.g., 2 to 80 wt. %) of the composite.

EXAMPLES

The following illustrative examples are intended to be non-limiting.

Example 1

Synthesis of N,N,N,3,5-Pentamethyladamantan-1-ammonium Hydroxide 3,5-Dimethyladamantan-1-amine was permethylated by treatment with a greater than 3-fold excess of methyl iodide and 2 equivalents of potassium bicarbonate in methanol over several days. The reaction mixture was concentrated under reduced pressure and the resulting solids were extracted 2 times with chloroform. The crude product was recovered by rotary evaporation of the chloroform under reduced pressure. The crude product was recovered by stripping off the chloroform. The crude product was heated in a minimum amount of 95% ethanol at 70° C. to produce a clear solution. The solution was allowed to cool to room temperature to provide the iodide salt as very clean crystals. The purity of the product was then verified by both a chemical analysis and H and C NMR in CDCL3.

The resulting iodide salt was exchanged to the corresponding hydroxide salt by stirring it with hydroxide exchange resin (AMBERLITE© IRN78) in deionized water overnight. The solution was filtered, and the filtrate was analyzed for hydroxide concentration by titration of a small sample with a standard solution of 0.1 N HCl.

Example 2

Synthesis of SSZ-117x with Boron

Into a tared 23 mL Parr reactor was added 0.27 g of Tosoh 390HUA Y-zeolite ($SiO_2/Al_2O_3$ molar ratio of about 500), 0.05 g of $GeO_2$, 0.02 g $H_3BO_3$, and 2.5 mmoles of an aqueous N,N,N,3,5-pentamethyladamantan-1-ammonium hydroxide solution. The reactor was then placed in a vented hood and water was allowed to evaporate to bring the $H_2O/(SiO_2+GeO_2)$ molar ratio to 7 (as determined by the total mass of the suspension). Then, HF (2.5 mmoles) was added and the reactor was heated to 160° C. with tumbling at 43 rpm for about 7 days. The solid products were recovered by centrifugation, washed with deionized water and dried at 95° C.

Powder XRD will show the final product to be a pure form of a new phase, designated SSZ-117x boron and exhibiting the characteristic peaks of Table 3.

Example 3

Acid Enhanced SSZ117x

Upon removal of all or part of the SDA by either calcination or by ozone treatment, the recovered product is then treated with an aluminum nitrate aqueous solution under reflux to provide the final SSZ-117x product with increased acid sites, which product also comprises some boron.

Example 4

Brønsted Acidity

Brønsted acidity of the molecular sieve of Example 3 was determined by n-propylamine temperature-programmed desorption (TPD) adapted from the published descriptions by T. J. Gricus Kofke et al. (J. Catal. 1988, 114, 34-45); T. J. Gricus Kofke et al. (J. Catal. 1989, 115, 265-272); and J. G. Tittensor et al. (J. Catal. 1992, 138, 714-720). A sample was pre-treated at 400° C.-500° C. for 1 hour in flowing dry $H_2$. The dehydrated sample was then cooled down to 120° C. in flowing dry helium and held at 120° C. for 30 minutes in a flowing helium saturated with n-propylamine for adsorption. The n-propylamine-saturated sample was then heated up to 500° C. at a rate of 10° C./minute in flowing dry helium. The Brønsted acidity was calculated based on the weight loss vs. temperature by thermogravimetric analysis (TGA) and effluent NH 3 and propene by mass spectrometry. The sample had a Brønsted acidity of 77.72 μmol/g, indicating that aluminum sites are incorporated into the framework of the molecular sieve.

Example 5

The as-synthesized boron SSZ-117 x of Example 2 was heated for 5 days at 150° C. in an excess of Dimethylformamide in a closed reactor. Upon cooling the solids were washed free of the solvent and then with water and dried at 95° C. The mass loss was 20% from this extraction. Then the dried solid was subjected to an ozonolysis at 150° C., overnight to remove any residual SDA in the pores. The open structure now had a greatly changed XRD pattern which is shown in Table 3.

TABLE 3

| 2-Theta[(a)] | d-Spacing, nm | Relative Intensity[(b)] |
|---|---|---|
| 8.00 | 1.10 | M |
| 11.65 | 0.76 | VS |
| 18.8 | 0.47 | M |
| 21.8 | 0.41 | M(Broad) |
| 22.8 | 0.39 | S |

[(a)]±0.30 degrees

[(b)]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The ozone treated product can then be treated to replace boron with aluminum, for example, by reflux with an aluminum nitrate aqueous solution. The resulting molecular sieve is SSZ-117x with boron and increased acid sites.

As used in this disclosure the word “comprises” or “comprising” is intended as an open-ended transition meaning the inclusion of the named elements, but not necessarily excluding other unnamed elements. The phrase “consists essentially of” or “consisting essentially of” is intended to mean the exclusion of other elements of any essential significance to the composition. The phrase “consisting of” or “consists of” is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

The invention claimed is:

1. A molecular sieve having a powder X-ray diffraction pattern including the following peaks:

| 2-Theta | d-Spacing, nm | Relative Intensity |
|---|---|---|
| 8.00 | 1.10 | M |
| 11.65 | 0.76 | VS |
| 18.8 | 0.47 | M |
| 21.8 | 0.41 | M(Broad) |
| 22.8 | 0.39 | S |

and with the molecular sieve comprising boron and having increased acid sites due to a boron pathway.

2. The molecular sieve of claim 1, having a composition comprising a molar relationship:

$Al_2O_3:(n)TO_2$ wherein n is ≥150; and T is a tetravalent element comprising silicon and germanium.

3. The molecular sieve of claim 1, having a composition comprising a molar relationship:

$Al_2O_3:(n)TO_2$ wherein n is ≥300; and T is a tetravalent element comprising silicon and germanium.

4. The molecular sieve of claim 1, having a chemical composition comprising the following molar relationship:

| | |
|---|---|
| $TO_2/Al_2O_3$ | ≥150 |
| $SiO_2/GeO_2$ | 4 to 12 |

wherein T is a tetravalent element comprising silicon and germanium.

5. A process for converting a feedstock comprising an organic compound to a conversion product, the process comprising contacting the feedstock at organic compound conversion conditions with a catalyst comprising the molecular sieve of claim 4.

6. A process of ion exchanging metals, the process comprising contacting a stream comprising heavy metals with the molecular sieve of claim 4.

7. The molecular sieve of claim 1, wherein the amount of boron in the molecular sieve ranges from 50-250 ppm.

8. A method of synthesizing the molecular sieve of claim 1, the method comprising:

(a) providing a reaction mixture comprising:
  (1) a FAU framework type zeolite having a $SiO_2/Al_2O_3$ mol ratio of 300 or greater;
  (2) a source of germanium;
  (3) a source of boron;
  (4) N,N,N,3,5-pentamethyladamantan-1-ammonium hydroxide (Q);
  (5) a source of fluoride ions; and
  (6) water;

(b) subjecting the reaction mixture to crystallization conditions sufficient to form crystals of the molecular sieve which contain boron;

(c) removing Q from the molecular sieve framework; and (d) replacing some of the boron in the molecular sieve crystals with aluminum.

9. The method of claim 8, wherein the reaction mixture has a composition, in terms of molar ratios, as follows:

| | |
|---|---|
| $TO_2/B_2O_3$ | ≥10 |
| $Q/TO_2$ | 0.10 to 1.00 |
| $F/TO_2$ | 0.10 to 1.00 |
| $H_2O/TO_2$ | 2 to 10 |
| $SiO_2/GeO_2$ | 4 to 12 |

wherein T is a tetravalent element comprising silicon and germanium.

10. The method of claim 8, wherein the reaction mixture has a composition, in terms of molar ratios, as follows:

| | |
|---|---|
| $TO_2/B_2O_3$ | 15 to 20 |
| $Q/TO_2$ | 0.20 to 0.70 |
| $F/TO_2$ | 0.20 to 0.70 |
| $H_2O/TO_2$ | 4 to 8 |
| $SiO_2/GeO_2$ | 7 to 10 |

wherein T is a tetravalent element comprising silicon and germanium.

11. The method of claim 8, wherein the FAU framework type zeolite is zeolite Y, or a post-synthetic modified form.

12. The method of claim 8, wherein the crystallization conditions include a temperature of from 125° C. to 200° C.

13. The method of claim 8, wherein the reaction mixture has a Q/F molar ratio in a range of 0.8 to 1.2.

14. The process of claim 8, wherein the Q is removed by calcination.

15. The process of claim 8, wherein the Q is removed by treatment with ozone.

16. The process of claim 8, wherein the replacing of boron with aluminum comprises refluxing the molecular sieve crystals with a solution of aluminum nitrate.

17. A process for converting a feedstock comprising an organic compound to a conversion product, the process comprising contacting the feedstock at organic compound conversion conditions with a catalyst comprising the molecular sieve of claim 1.

18. A process of ion exchanging metals, the process comprising contacting a stream comprising heavy metals with the molecular sieve of claim 1.

* * * * *